(12) United States Patent
Prosol

(10) Patent No.: US 6,247,264 B1
(45) Date of Patent: Jun. 19, 2001

(54) SEA TRAP AND METHOD OF USE

(76) Inventor: Mikhail I. Prosol, 5314 Eagle St., Long Beach, CA (US) 90815-1918

( * ) Notice: Subject to any disclaimer, the term of this patent is extended or adjusted under 35 U.S.C. 154(b) by 0 days.

(21) Appl. No.: 09/455,957

(22) Filed: Dec. 7, 1999

(51) Int. Cl.[7] .......................... A01K 69/06; A01K 69/10
(52) U.S. Cl. .................................. 43/100; 43/102; 43/105
(58) Field of Search ................................. 43/100–105

(56) References Cited

U.S. PATENT DOCUMENTS

| | | | |
|---|---|---|---|
| 3,055,139 | * | 9/1962 | Condello ................................. 43/102 |
| 4,141,172 | * | 2/1979 | Prosol ..................................... 43/105 |
| 4,373,288 | * | 2/1983 | McCrink ................................. 43/100 |
| 4,393,617 | * | 7/1983 | Charnoske ............................. 43/100 |
| 4,406,083 | * | 9/1983 | Hart ....................................... 43/105 |
| 4,445,295 | * | 5/1984 | Litrico ................................... 43/102 |
| 4,638,588 | * | 1/1987 | Abadie ................................... 43/103 |
| 4,831,774 | * | 5/1989 | Gonzalez ............................... 43/100 |
| 4,980,989 | * | 1/1991 | Davis ..................................... 43/100 |

FOREIGN PATENT DOCUMENTS

| | | | |
|---|---|---|---|
| 56667 | * | 6/1967 | (DE) ...................................... 43/105 |
| 1043571 | * | 11/1953 | (FR) ...................................... 43/105 |
| 2150801 | * | 7/1985 | (GB) ...................................... 43/105 |
| 2178932 | * | 2/1987 | (GB) . |
| 2209262 | * | 5/1989 | (GB) ...................................... 43/105 |
| 581407 | * | 8/1958 | (IT) ....................................... 43/105 |

* cited by examiner

*Primary Examiner*—Darren W. Ark
(74) *Attorney, Agent, or Firm*—Ted Masters

(57) ABSTRACT

A sea trap (20) includes a first jaw (22) which cooperates with a second jaw (24). Jaws (22) and (24) are connected to a base (30), and the jaws (22) and (24), and the base (30) are covered with an animal-retaining enveloping material (26) such as netting. Jaws (22) and (24) are biased by springs (32) and (34) to a closed animal-retaining state. The sea trap (20) is placed in an open animal-receiving state and a trigger mechanism (28) is armed. An animal (500) activates the trigger mechanism (28) thereby causing the sea trap (20) to rapidly close to the animal-retaining state and capturing the animal (500) within the enveloping material (26). In a preferred embodiment sea trap (20) is used in a body of water (502) to trap marine animals (500). In this embodiment a float (50) provides a visual indication that sea trap (20) has been closed and an animal (500) captured.

4 Claims, 10 Drawing Sheets

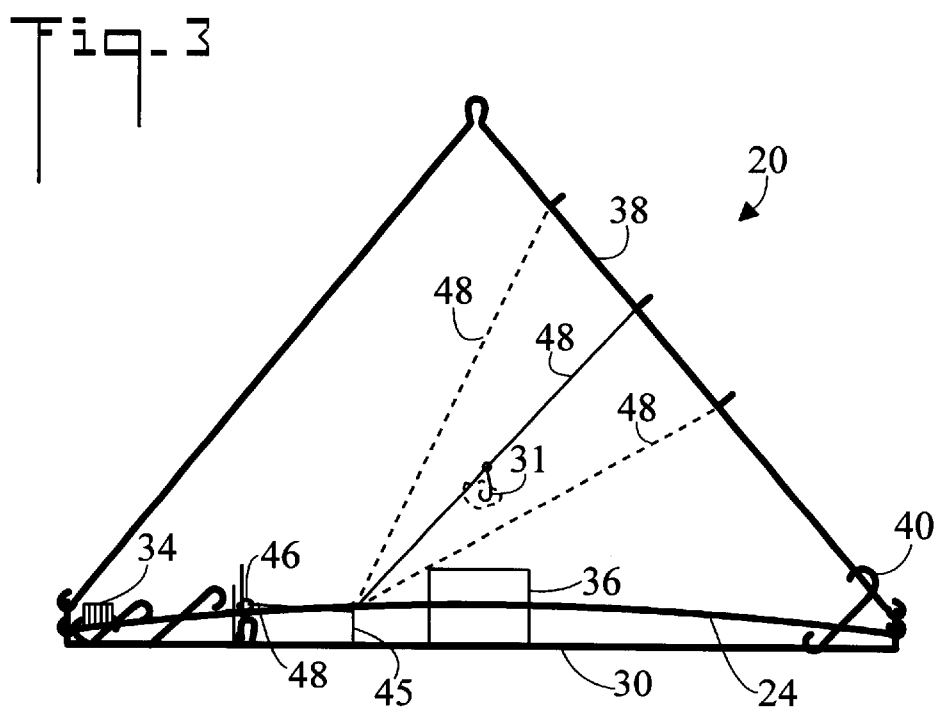
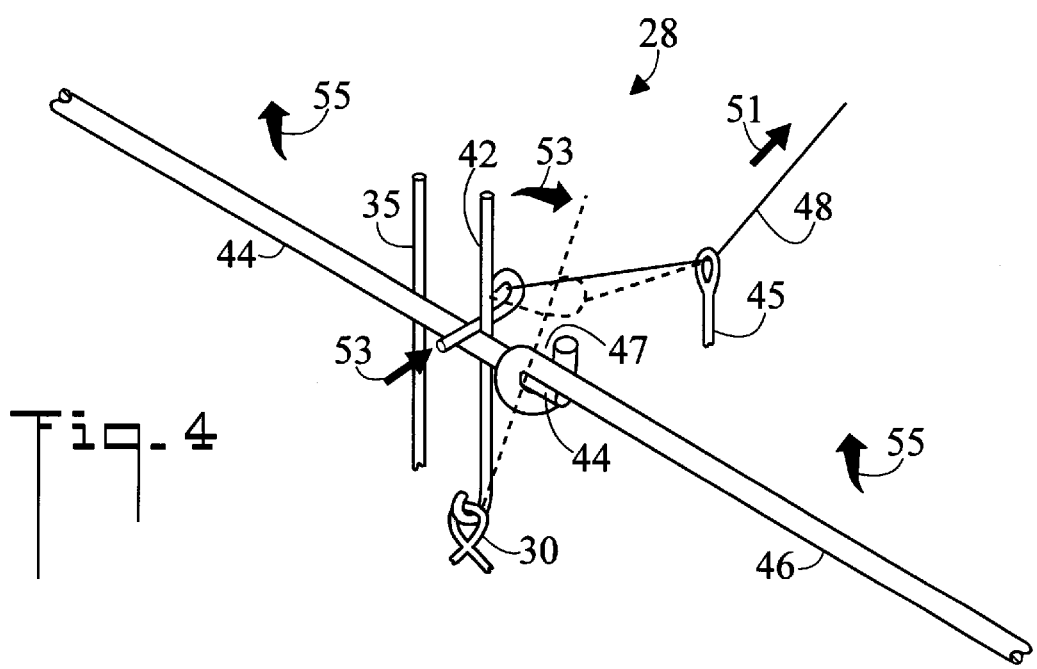

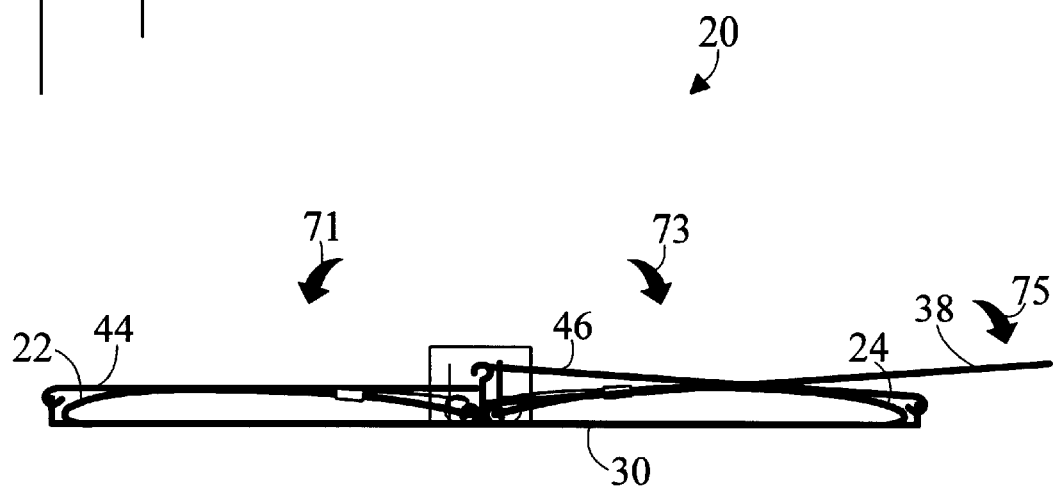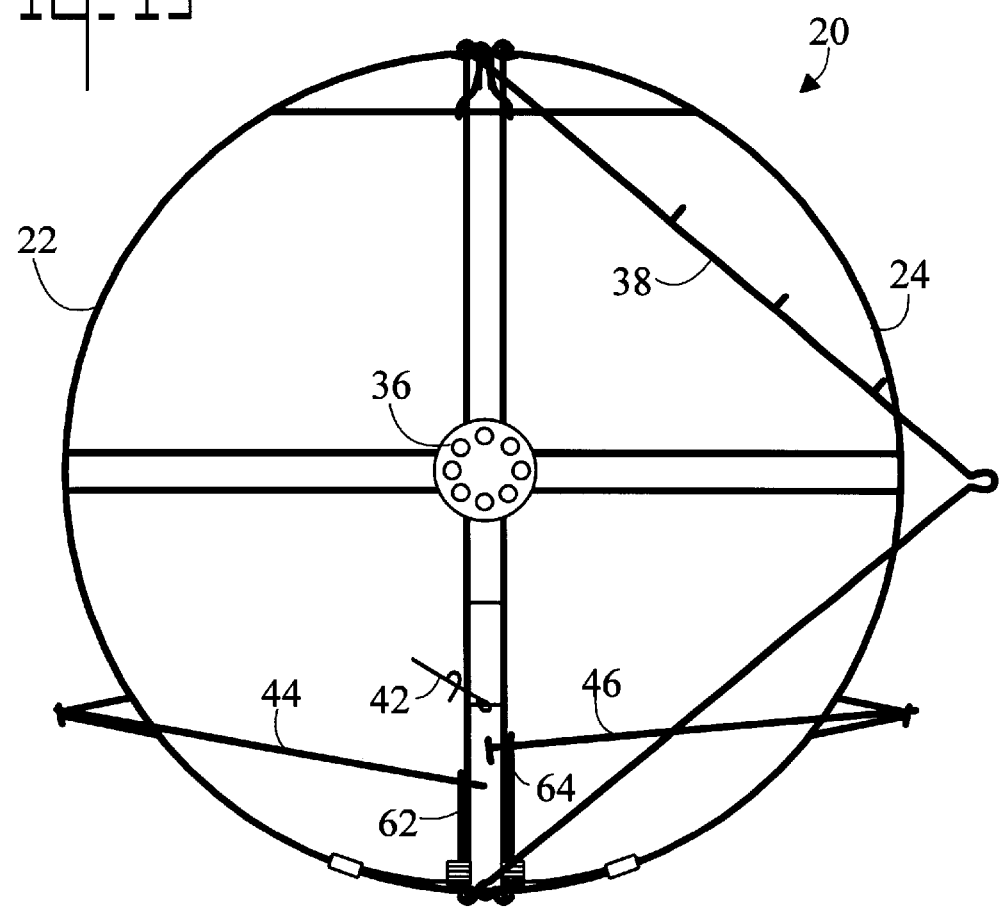

SEA TRAP AND METHOD OF USE

TECHNICAL FIELD

The present invention pertains generally to devices for trapping animals, and in particular to a sea trap which employees two cooperating jaws which carry netting or other suitable material to completely envelop marine animals. The sea trap includes a float which provides a visual signal that the trap has been closed and an animal captured.

BACKGROUND ART

Animal traps are well known in the art. These devices range from snares for birds to toothed jaw traps for four legged animals, and from sea nets to trap door housings. For example, U.S. pat. No. 4,141,172 discloses an automatic crustacean trap which includes a rigid, planar, wire base supporting a vertically tubular mount having disposed on the interior thereof a pivotally supported latch. Connected to the latch and extending to the exterior of the mount is a bait dispenser disposed to be articulated by the crustacean entering the trap for concurrent pivotal articulation of the latch. Two peripheral frame members conforming to the halves of the peripheral edge of the base are hinged in diametric alignment on the base, the free edges thereof being engaged to corresponding connecting members which at the other end attach to a collar disposed around a tubular guide telescopically attached to extend out of the free end of the mount. Disposed on the interior of the guide is a latching rod including a lip on the lower end thereof engageable by said latch, the rod engaging the collar thorough two longitudinal slots formed in the guide. To provide the necessary trapping forces each frame member is spring biased to pivot away from the base deploying a flexible mesh screen connected therebetween upon the release of the latch. Concurrently the connecting members advance the collar and the rod outwardly along the guide to articulate a float indicating a closure.

DISCLOSURE OF INVENTION

The present invention is directed to an improved sea trap. In a preferred embodiment the sea trap is used in a marine environment to catch marine animals such as lobsters, crayfish, crabs, fish, and the like. In this embodiment the sea trap has a preferred name of "Universal Sea Trap". Some of the advantages of the sea trap of the present invention are:

1. Anyone can use the sea trap, kids, professionals, sport fisherman of all ages can enjoy successful lobster, crab, and other sea creature fishing.
2. The present invention may be used from a boat, from a dock or pier, from a bridge, or even from the shore.
3. The jaws of the present invention close rapidly (in less than one half second) thereby capturing even swift moving fish. This is in contrast to other types of traps which close slowly and can allow swift moving creatures to escape, particularly a fast moving fish.
4. The present invention also includes a novel signaling feature which informs the user when the trap has been closed. When the trap closes, a float is released which rises to the surface thereby alerting the user. This eliminates the need to periodically raise the trap to see if any marine animals have be caught.
5. The present invention is extremely simple to operate. First, a centrally located baitcup is loaded with the appropriate bait. Next, the sea trap is armed in a manner similar to a mousetrap. And finally, the sea trap is lowered into the water with a length of rope sufficient to reach the floor of the body of water. When the signal float appears at the surface, the trap is simply hauled in with the catch.
6. The present invention is both safe and environmentally friendly, and humanely traps the animal without inflicting harm or damage.

In accordance with a preferred embodiment of the invention, a sea trap includes a first jaw which pivotally cooperates with a second jaw, the jaws being movable between a horizontal open animal-receiving state and a vertical closed animal-retaining state. An animal-retaining enveloping material such as netting is connected to the jaws. When activated, a trigger mechanism causes the sea trap to spring shut with the jaws to rapidly moving from the open substantially horizontal state to the closed substantially vertical state, thereby capturing the animal within the enveloping material.

In accordance with a preferred embodiment of the invention, the sea trap has a base with the first and second jaws being pivotally connected to the base.

In accordance with a preferred embodiment of the invention, a first spring is connected between the first jaw and the base, and a second spring is connected between said second jaw and the base. The first and second springs urge the jaws toward the closed state. The base also carries an animal-retaining enveloping material, and a bait container.

In accordance with a preferred embodiment of the invention, a trigger mechanism includes a trip assembly pivotally connected to the base, and first and second retaining rods also pivotally connected to the base, wherein the first and second retaining rods are releasably connected to the trip assembly. When the sea trap is armed, the retaining rods hold the jaws in the open position. When the trip assembly is activated by the animal, the retaining rods are released, and they in turn release the jaws permitting the trap to spring shut.

In accordance with a preferred embodiment, a locking mechanism holds the jaws in their open state during storage or shipment. The retaining rods are also a part of the locking mechanism.

In accordance with a preferred embodiment, a float is captively retained by one of the jaws and associated enveloping material when the jaws are in the armed open state. The float is released and free to move to the surface of the body of water when the jaws move from the armed open state to the closed state. The appearance of the float on the surface alerts a user that the trap has closed and an animal has been captured.

While the present invention is especially useful for trapping marine animals, it can also be used to trap small land animals or even birds.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 3 is a side elevation view of the sea trap;

FIG. 4 is an enlarged perspective view of a trigger mechanism of area 4 of FIG. 2;

FIG. 18 is a front elevation view of the sea trap placed in a collapsed storage or shipment state; and, FIG. 19 is a top plan view of the sea trap in the storage or shipment state.

MODES FOR CARRYING OUT THE INVENTION

Figure 1:
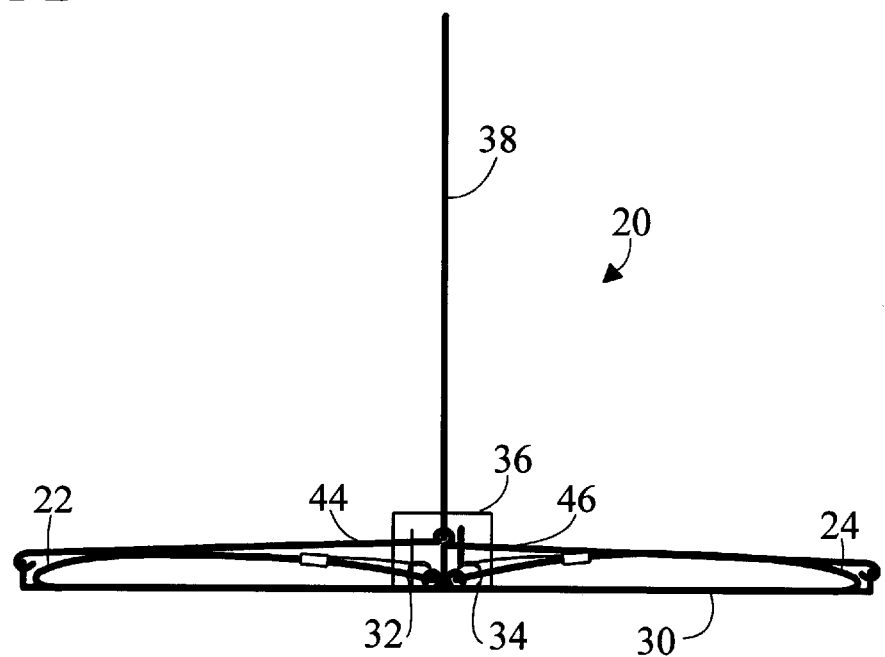
FIG. 1 is a front elevation view of a sea trap in accordance with the present invention, the trap being in an open armed animal-receiving state.
Figure 2:
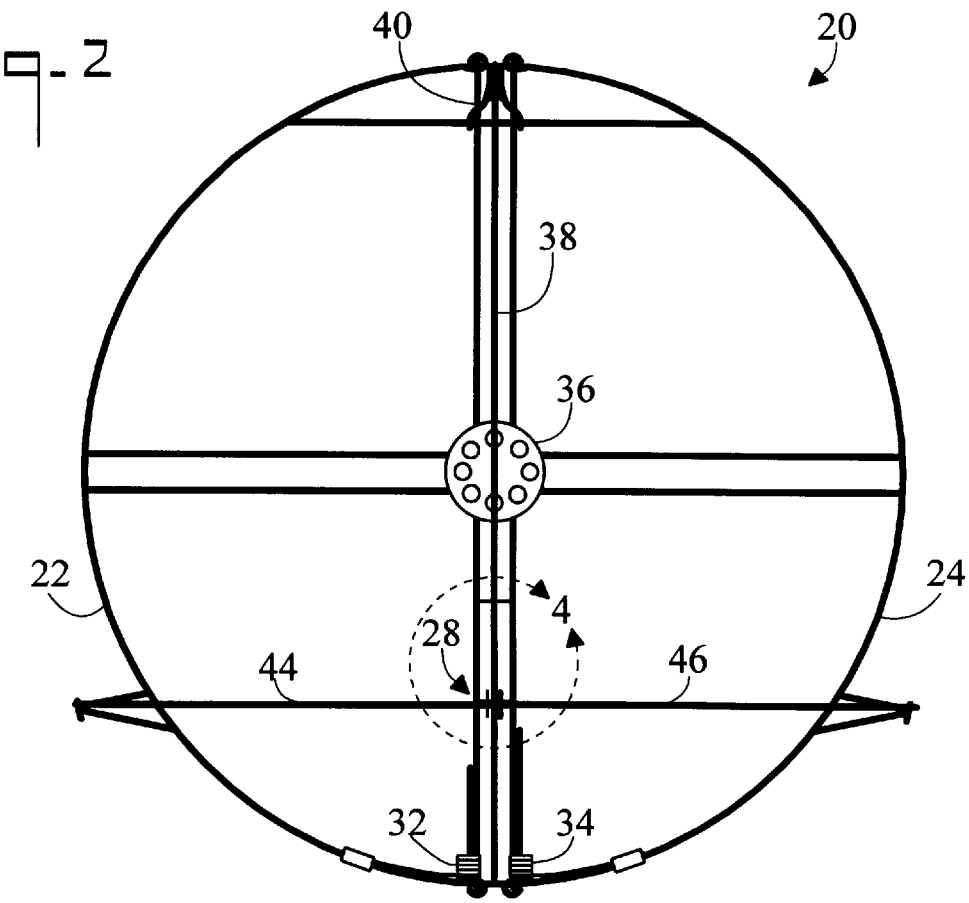
FIG. 2 is a top plan view of the sea trap.
Figure 7:
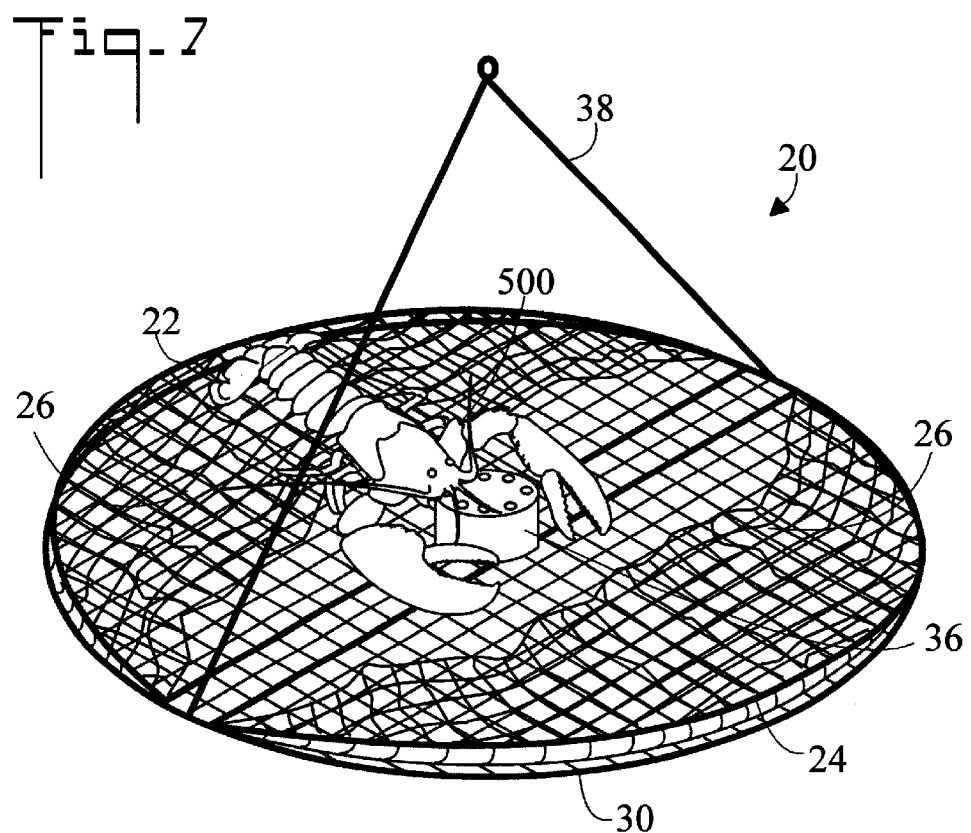
FIG. 7 is a simplified perspective view of the sea trap in the armed state just before an animal activates the trigger mechanism.
Figure 8:
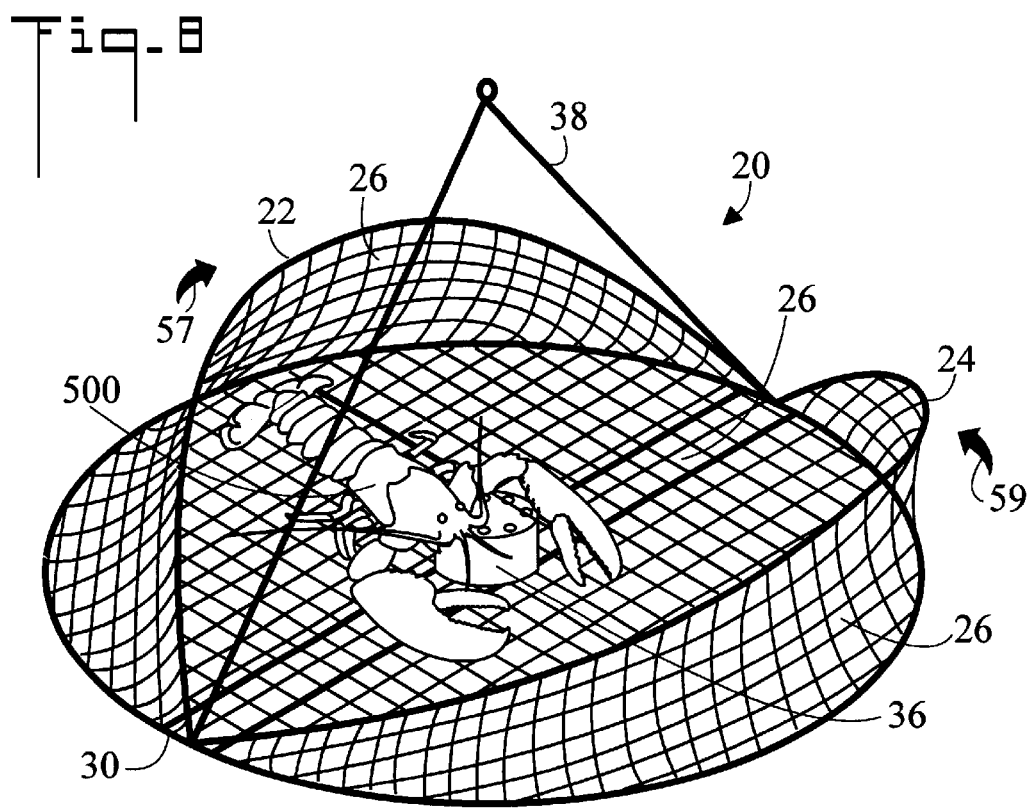
FIG. 8 is a simplified perspective view of the sea trap an instant after the animal has activated the trigger mechanism, wherein the jaws are in process of rapidly closing.
Figure 9:
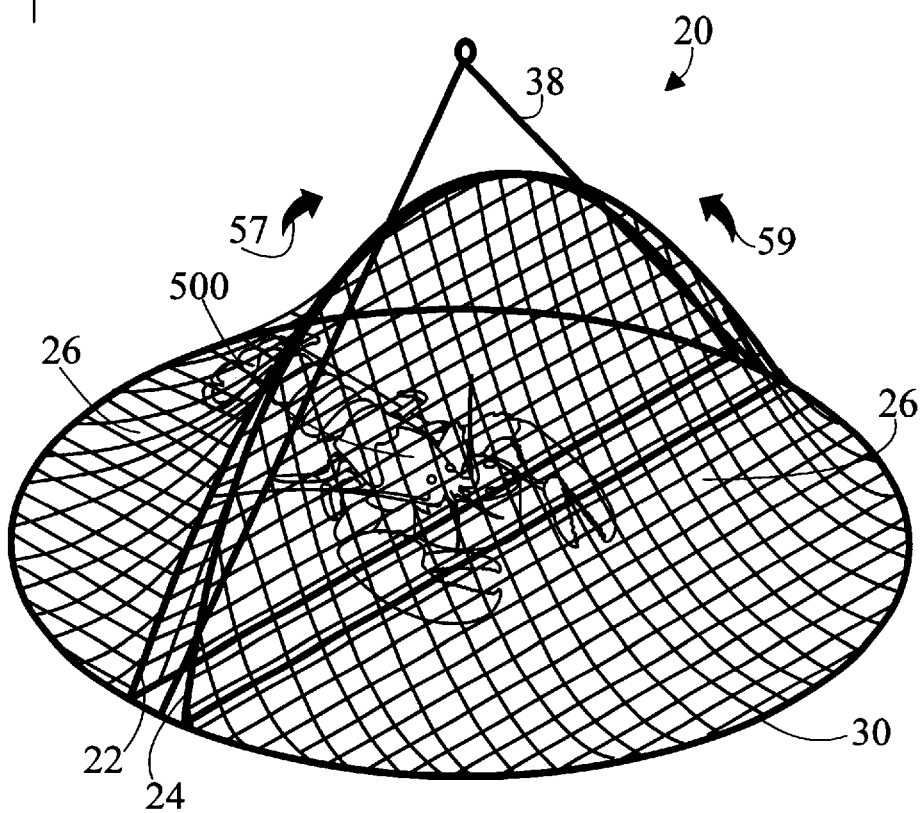
FIG. 9 is a simplified perspective view of the sea trap in the tripped state showing the captured animal with the jaws fully closed.

Referring initially to FIGS. 1–3, there are shown front elevation, top plan, and side elevation views respectively of a sea trap in accordance with the present invention, generally designated as 20. In FIGS. 1–3 sea trap 20 in is in its open armed animal-receiving state. FIGS. 7–9 show simplified perspective views of sea trap 20 in three progressive stages of closure. It is noted that in FIGs, 1–3, 5–6, and 16–19, for clarity sea trap 20 is shown without its animal-retaining enveloping material, which in a preferred embodiment comprises netting, mesh, or screen. FIGS. 7–9 and 11–15 show the enveloping material in place.

Sea trap 20 includes a first jaw 22 pivotally cooperating with a second jaw 24. The first 22 and second 24 jaws are movable between an open animal-receiving state (refer to FIGS. 1–3, and 7), and a closed animal-retaining state (refer to FIGS. 5–6, and 9). In a preferred embodiment first 22 and second 24 jaws include first and second frames respectively, the first and second frames each carrying an animal-retaining enveloping material 26 (refer to FIGS. 7–9). The animal-retaining enveloping material 26 is connected between the first 22 and second 24 jaws and the base 30 of sea trap 20. In a preferred embodiment the animal-retaining enveloping material 26 is netting or some other mesh-like material, however other flexible materials could also be used. The animal-retaining enveloping material 26 is connected between the perimeter of jaws 22 and 24 and the perimeter of base 30 (see below). A trigger mechanism 28 (also refer to FIG. 4) causes the first 22 and second 24 jaws to move from the open state to the closed state (refer to FIGS. 7–9).

Sea trap 20 also includes a base 30 having a base frame which also carries an animal-retaining enveloping material 26 such as netting. First 22 and second 24 jaws are pivotally connected to base 30. A first spring 32 is connected between first jaw 22 and base 30, and a second spring 34 is connected between second jaw 24 and base 30. First 32 and second 34 springs urge or bias first 22 and second 24 jaws toward the closed animal-retaining state. The stiffness of springs 32 and 34 is selected to cause jaws 22 and 24 to rapidly close once trigger mechanism 28 is activated. It may also be appreciated that jaws 22 and 24 could be pivotally connected to each other with springs 32 and 34 disposed between the jaws, and the jaws then connected to the base 30. In a preferred embodiment, once trigger mechanism 28 is activated, jaws 22 and 24 will move from the open state to the closed state in less than one half second. A bait container 36 is disposed upon base 30. In the shown preferred embodiment, base 30 is circular and first 22 and second 24 jaws are semi-circular. It may readily appreciated however the other shapes, for example square or rectangular, could also be employed. Sea trap 20 also includes a handle 38 which is pivotally connected to base 30. A pivoting holder 40 is connected to base 30, and is utilized to selectively hold handle 38 in an upstanding position.

Referring also to FIG. 4, there is illustrated an enlarged perspective view of trigger mechanism 28. Trigger mechanism 28 includes a trip assembly 42 connected to base 30, and first 44 and second 46 retaining rods pivotally connected to base 30. First 44 and second 46 retaining rods are releasably connected to trip assembly 42. When sea trap 20 is in the open armed state, first 44 and second 46 retaining rods hold first 22 and second 24 jaws respectively in the open state. That is, the jaws are held open by the retaining rods 44 and 46 and springs 32 and 34 store potential energy that is released when trigger mechanism 28 is activated, thereby rapidly closing the jaws. Second retaining rod 46 has a curled end 47 which longitudinally and upwardly accepts first retaining rod 44. Trip assembly 42 releasably abuts first retaining rod 44, and in the armed state, prevents first retaining rod 44 from moving upward. At least one trip line 48 is connected to trip assembly 42 via eye 45 which is connected to base 30 (also refer to FIG. 3). The other end of trip line 48 is connected to handle 38, so that when the animal 500 approaches bait container 36, the animal 500 pulls or otherwise engages trip line 48 thereby pulling trip assembly 42 away from first retaining rod 44 and releasing the retaining rods and therefore also releasing jaws 22 and 24. Referring to FIG. 3, in a preferred embodiment, trip line 48 carries a hook 31 to which bait is attached.

To arm trigger mechanism 28 first jaw 22 is forced into an open state and first retaining rod 44 is placed over first jaw 22. Trip assembly 42 is then place over first retaining rod 44 to hold it in place, thereby also holding first jaw 22 in the open state. Second jaw 24 is then forced into the open state and second retaining rod 46 is placed over second jaw 24. The curled end 47 of second retaining rod 46 is then placed under and engages first retaining rod 44, so that both jaws 22 and 24 are held downward in the open state.

When trip line 48 is moved in direction 51 by an animal 500 (refer to FIGS. 7–9), trip assembly 42 is moved off of first retaining rod 44 in direction 53. Trip assembly 42 releases first retaining rod 44 upward in direction 55 which in turn releases second retaining rod 46 upward also in direction 55. With the retaining rods released, jaws 22 and 24 are biased into the closed animal-retaining state by springs 32 and 34 (refer to FIGS. 5, 6, 8, and 9). Guide 35 which is connected to base 30 serves to assist in the longitudinal alignment of first retaining rod 44 with second retaining rod 46 during the arming process.

Figure 5:
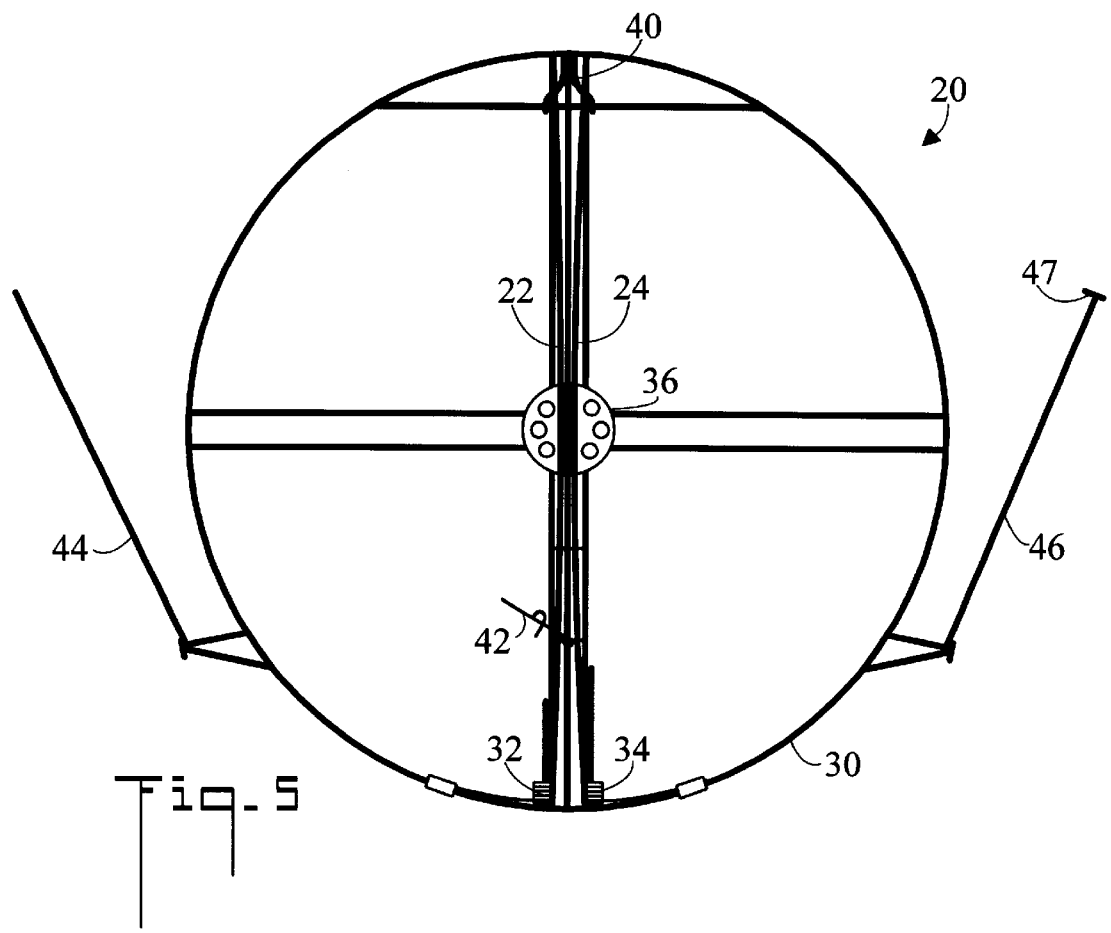
FIG. 5 is a top plan view of the sea trap in a closed tripped animal retaining state.
Figure 6:
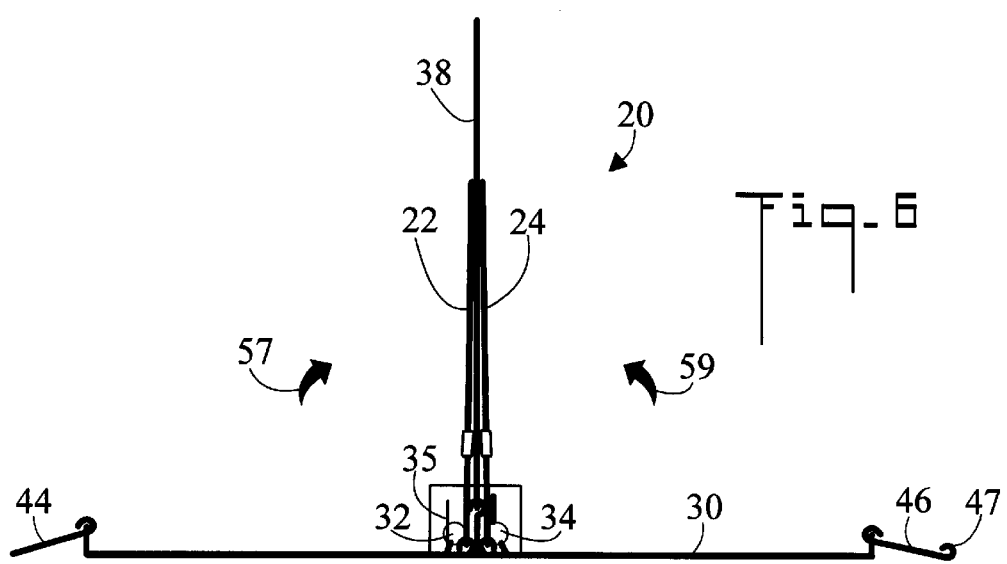
FIG. 6 is a front elevation view of the sea trap in the closed tripped state.

FIGS. 5 and 6 are top plan and front elevation views respectively of sea trap 20 in a closed tripped state. Trip assembly 42 has released first and second retaining rods 44 and 46, and jaws 22 and 24 have rapidly moved in directions 57 and 59 respectively to the closed upwardly extending position through the action of springs 32 and 34.

FIG. 7 is a simplified perspective view of sea trap 20 in the armed state just before an animal 500 activates trigger mechanism 28 (refer to FIG. 4). The animal 500 has been attracted by bait placed in the bait container 36, and has crawled onto sea trap 20.

FIG. 8 is a simplified perspective view of sea trap 20 an instant after the animal 500 has activated trigger mechanism 28, wherein the jaws 22 and 24 are partially closed in directions 57 and 59 due to the biasing action of springs 32 and 34 (refer to FIGS. 1–3).

FIG. 9 is a simplified perspective view of sea trap 20 in the closed tripped state showing the captured animal 500 with jaws 22 and 24 fully closed. The animal 500 is now captured and fully surrounded by enveloping material 26 which is carried by jaws 22 and 24, and base 30.

Figure 10:
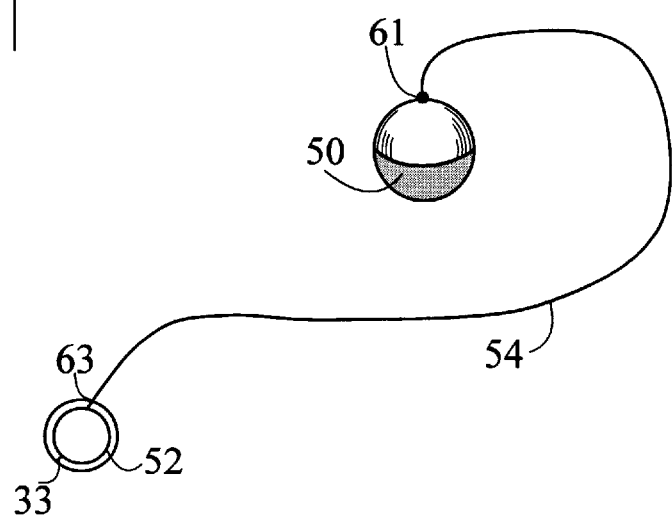
FIG. 10 is a perspective view of a float connected to a slide by a tether.
Figure 11:
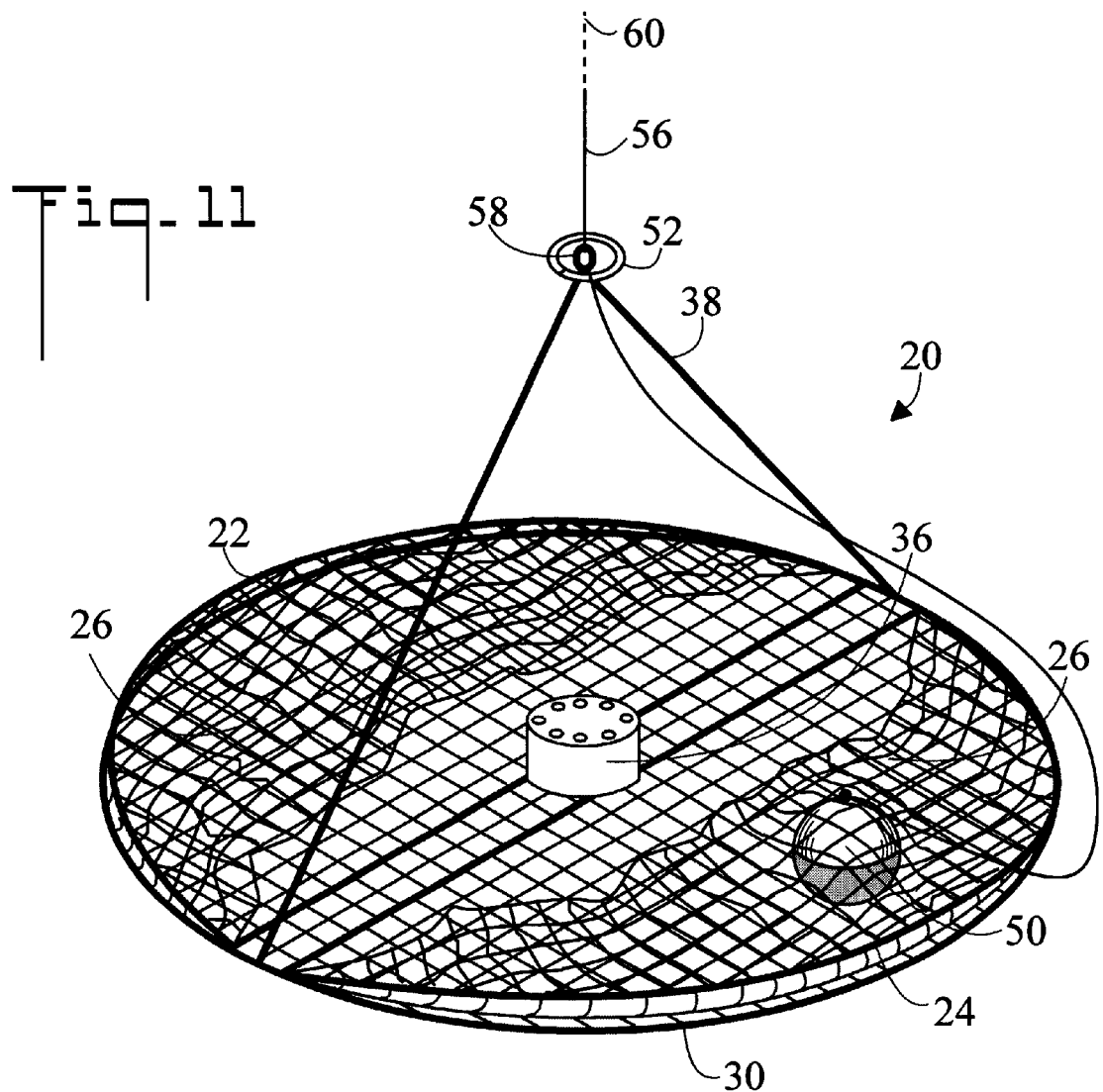
FIG. 11 is a simplified perspective view of the sea trap in the armed state with the float being retained by one of the jaws and enveloping material of the sea trap.

In a preferred embodiment, sea trap 20 is used beneath the surface of a body of water 502 to catch lobster, crayfish, crabs, fish, and the like. Regarding this embodiment, FIG. 10 is a perspective view of a float 50 connected to a slide 52 by a tether 54, and FIG. 11 is a simplified perspective view of sea trap 20 in the open armed state with float 50 being retained by one of the jaws and associated enveloping material. Float 50 is captively retained by one of first jaw 22 and second jaw 24 and its associated enveloping material 26 when the sea trap 20 is armed and the jaws are in the open animal-receiving state. This is accomplished by simply placing float 50 underneath one of the jaws as the sea trap 20 is being opened and armed. As will be seen later, float 50 is released when first 22 and second 24 jaws move from the open state to the closed state. The closing of jaws 22 and 24 releases float 50 thereby allowing it to travel to the surface of the body of water 502, thus providing a visual signal the sea trap 20 has been closed and an animal 500 captured.

Sea trap 20 further includes a line 56 having a first end 58 and an opposite second end 60. First end 58 is connected to an eye in handle 38 of sea trap 20, and second end 60 extends to the surface of the body of water 502 (also refer to FIG. 12). Float 50 is slidably connected to line 56. Slide 52 is disposed around line 56. Tether 54 has a first end 61 connected to float 50, and an opposite second end 63 connected to slide 52. And, slide 52 includes an opening clasp 33 which may be selectively opened to receive line 56 (such as a shower curtain ring).

Figure 12:
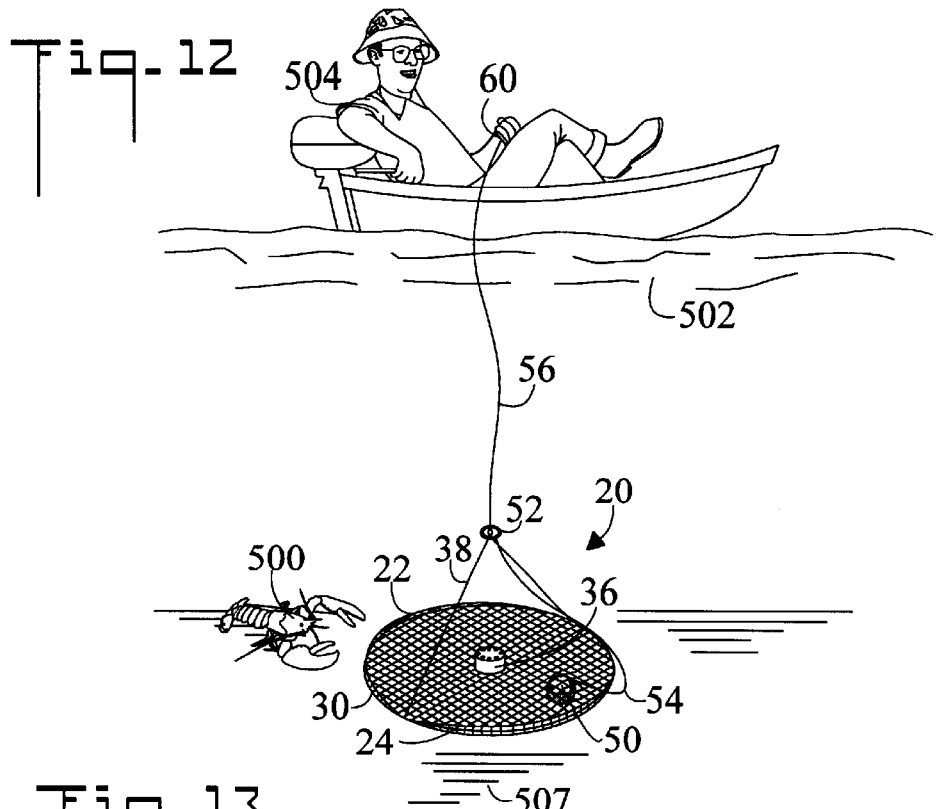
FIG. 12 is reduced perspective view of the sea trap in the armed state disposed by a user beneath the surface of a body of water.

FIG. 12 is reduced perspective view of sea trap 20 in the armed state disposed by a user 504 beneath the surface of a body of water 502. The user 504 holds second end 60 of line 56, and lets out enough line 56 to allow sea trap 20 to sink to and rest upon bottom surface 507. Float 50 is captively placed under one of the jaws 22 or 24, and connected to slide 52 by tether 54. Slide 52 surrounds line 56. A marine animal 500 is attracted by the bait in bait container 36 and approaches sea trap 20.

Figure 13:
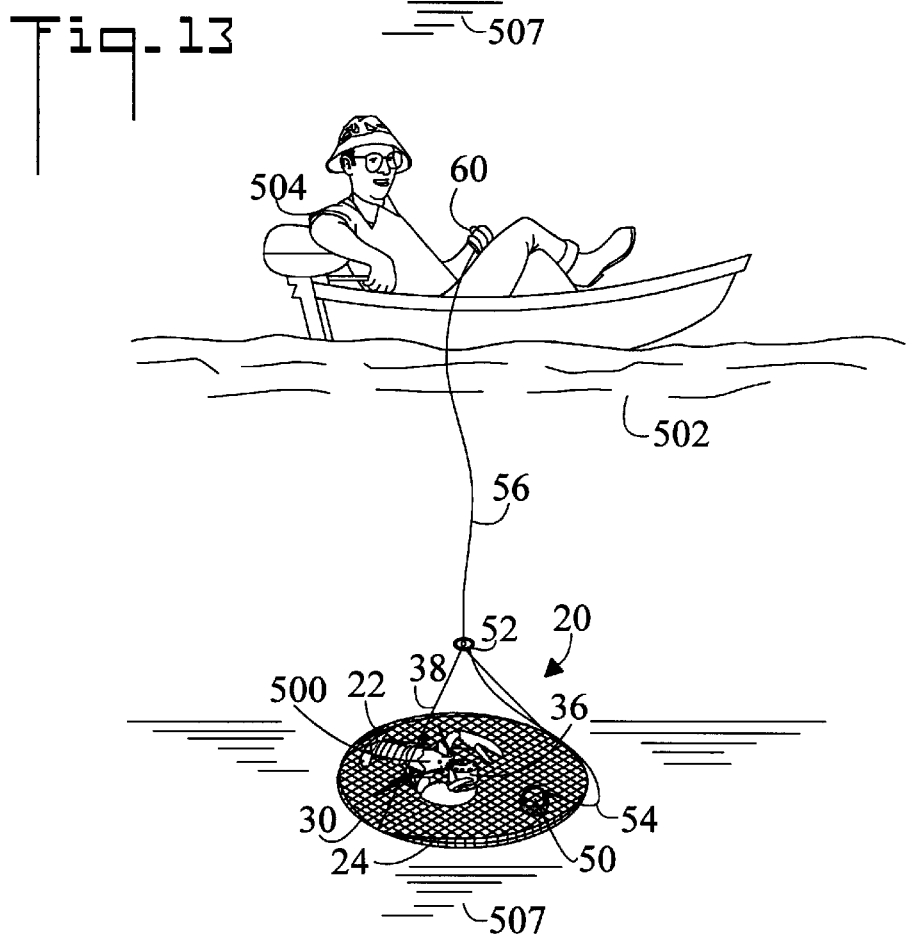
FIG. 13 is a reduced perspective view just before an animal activates the trigger mechanism.

FIG. 13 is a reduced perspective view just before animal 500 activates trigger mechanism 28. The animal 500 is positioned upon sea trap 20, is starting to consume the bait, and is about to activate trigger mechanism 28 (refer to FIG. 4).

Figure 14:
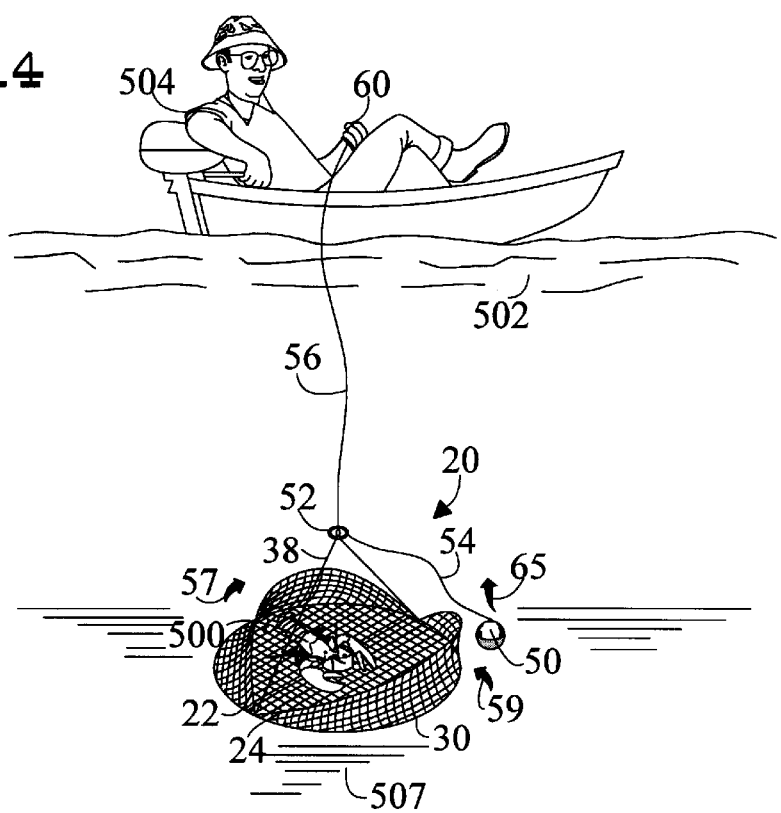
FIG. 14 is a reduced perspective view an instant after the animal has activated the trigger mechanism.

FIG. 14 is a reduced perspective view an instant after animal 500 has activated trigger mechanism 28. Jaws 22 and 24 have been released and are rapidly urged upward to a closed state in directions 57 and 59 respectively. Releasing jaw 24 frees float 50, and allows float 50 to travel upward in direction 65 toward the surface of the body of water 502.

Figure 15:
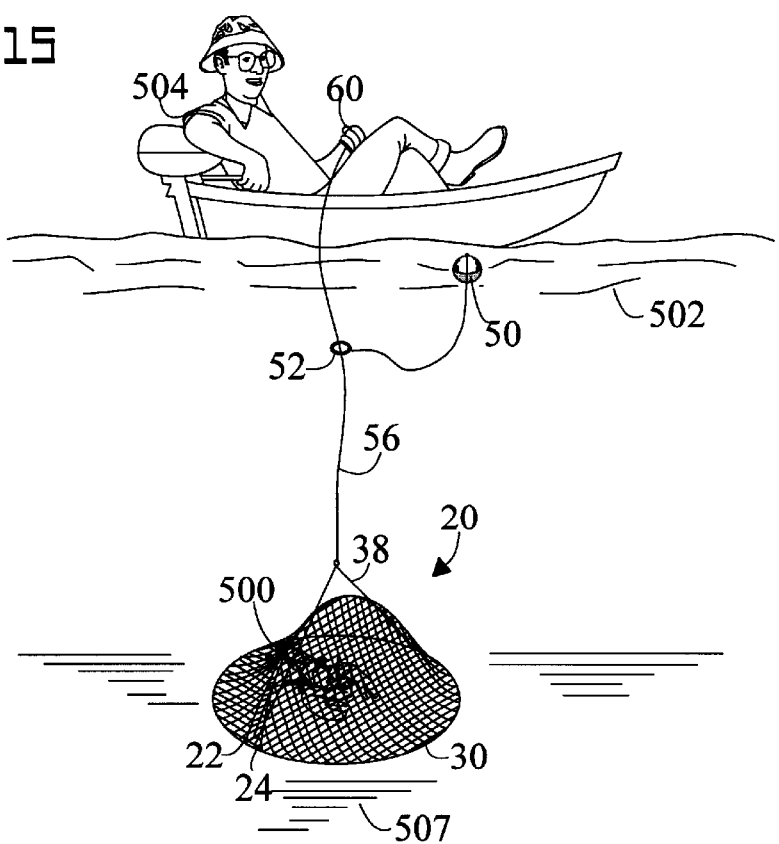
FIG. 15 is a reduced perspective view of the sea trap with its jaws fully closed thereby capturing the animal.

FIG. 15 is a reduced perspective view of sea trap 20 with its jaws 22 and 24 fully closed thereby capturing animal 500. Float 50 has traveled to the surface of the body of water 502, thereby providing the user 504 with a visual indication that an animal 500 has been captured. As float 50 rises, it pulls slide 52 upward along line 56.

In terms of using sea trap 20 to capture a marine animal 500, the user 504 places the first 22 and second 24 jaws in the open state, adds bait to the bait container 36, and arms trigger mechanism 28. During the arming process float 50 is placed beneath one of the jaws so that it is captively held in place. The user then uses line 56 to lower sea trap 20 into the body of water 502. The marine animal 500 activates trigger mechanism 28 thereby causing the jaws 22 and 24 to close, capturing the marine animal 500, and releasing float 50 which then rises to the surface of the body of water 502. The user 504 observes that float 50 has risen to the surface of the body of water 502, and knows that an animal 500 has been captured.

Figure 16:
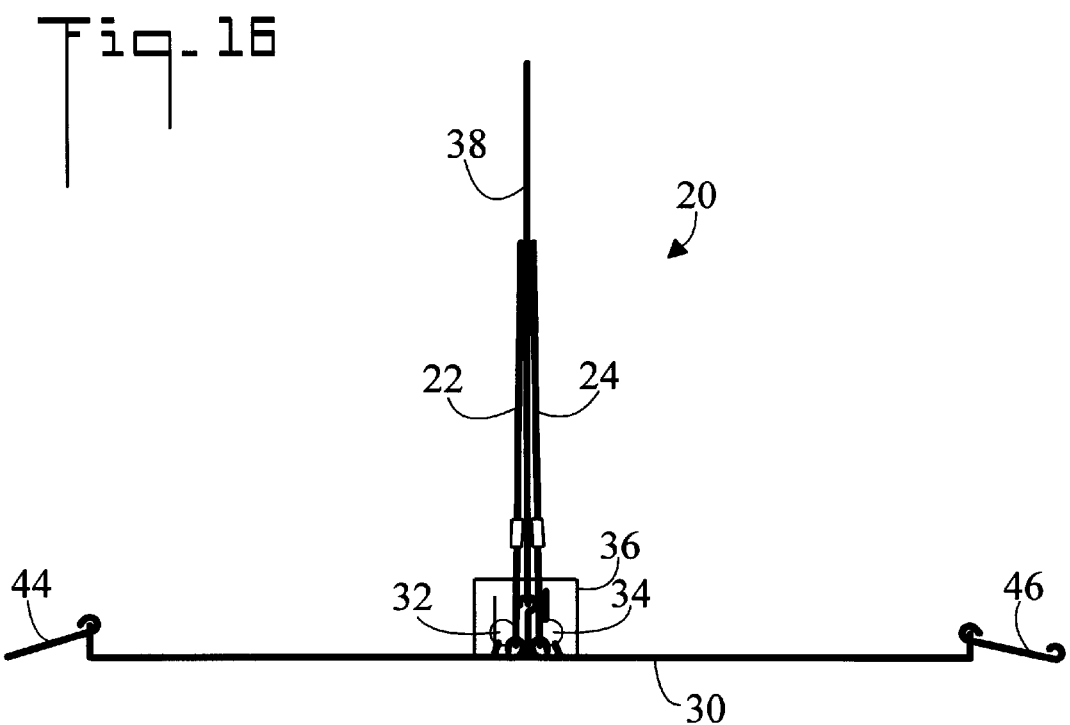
FIG. 16 is a front elevation view of the sea trap in the closed tripped state.
Figure 17:
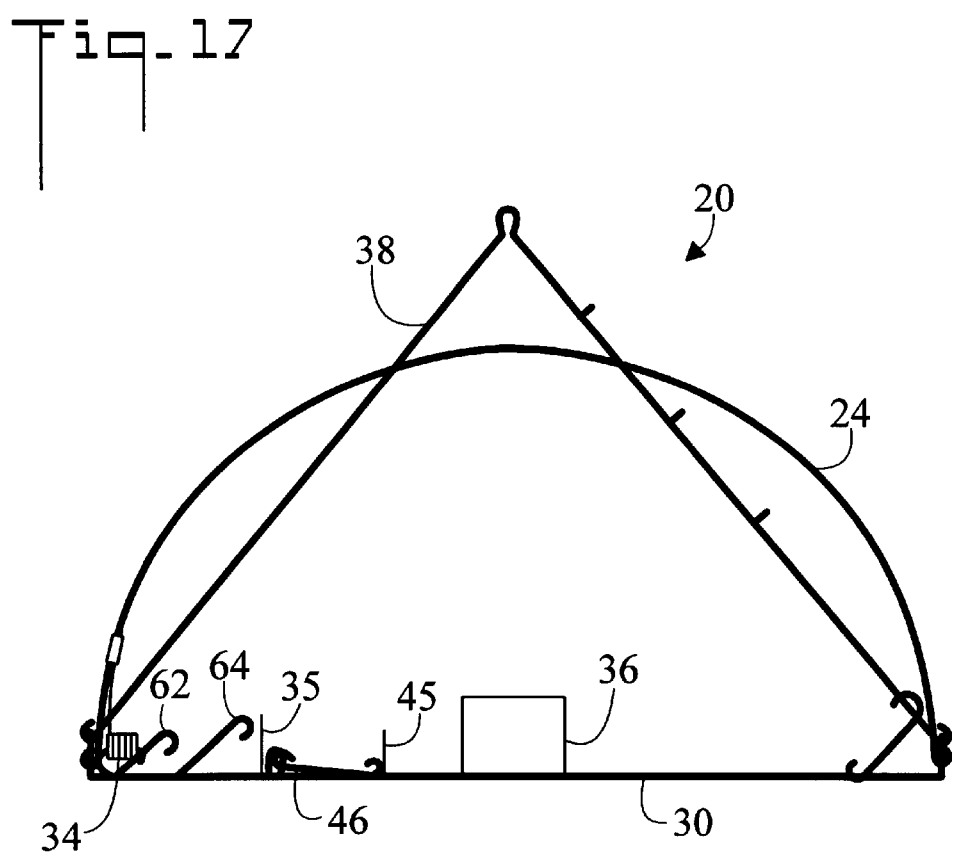
FIG. 17 is a side elevation view of the sea trap in the tripped state.

FIGS. 16 and 17 are front elevation and side elevation views respectively of sea trap 20 in the tripped state. First retaining rod 44 and second retaining rod 46 have been released by trigger mechanism 28 (refer to FIG. 4), and springs 32 and 34 have forced first jaw 22 and second jaw 24 respectively into an upstanding position. Sea trap 20 also includes a locking mechanism for holding first jaw 22 and second jaw 24 in the open state during storage or shipment. Base 30 has first 62 and second 64 safety hooks. The locking mechanism includes first 44 and second 46 retaining rods which cooperate with first 62 and second 64 safety hooks to hold first 22 and second 24 jaws in the open state (also refer to FIGS. 18 and 19). The locking mechanism is also employed to hold jaws 22 and 24 in the open state during arming and the placement of bait.

FIGS. 18 and 19 are front elevation and top plan views respectively of sea trap 20 placed in a storage or shipment state. First jaw 22 and second jaw 24 have been forced into the open position in directions 71 and 73 respectively. First retaining rod 44 has been engaged by first safety hook 62 and second retaining rod 46 has been engaged by second storage rod 64, thereby holding first jaw 22 and second jaw 24 in the open position. In FIG. 19, handle 38 has been pivoted downward in direction 75 so that it is essentially coplanar with base 30.

In a preferred embodiment the jaws, base, trigger mechanism, locking mechanism, springs, handle, and trip mechanism are fabricated from stainless steel rod or wire, however other materials such as a polymer could also be used.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A sea trap, comprising:

a first jaw pivotally cooperating with a second jaw;

said first and second jaws movable between an open animal-receiving state and a closed animal-retaining state;

said first and second jaws each carrying an animal-retaining enveloping material;

a trigger mechanism for causing said first and second jaws to move from said open state to said closed state;

a base, said first jaw and said second jaw pivotally connected to said base;

said first and second jaws biased toward said closed state;

said trigger mechanism including a trip assembly connected to said base, and first and second retaining rods pivotally connected to said base, wherein said first and second retaining rods are releasably connected to said trip assembly;

said first and second retaining rods holding said first and second jaws respectively in said open state;

said second retaining rod having a curled end which longitudinally and upwardly accepts said first retaining rod; and, said trip assembly releasably abutting said first retaining rod.

2. A sea trap according to claim 1, further including:

at least one trip line connected to said trip assembly.

3. A sea trap, comprising:

a first jaw pivotally cooperating with a second jaw;

said first and second jaws movable between an open animal-receiving state and a closed animal-retaining state;

said first and second jaws each carrying an animal-retaining enveloping material;

a trigger mechanism for causing said first and second jaws to move from said open state to said closed state;

a locking mechanism for holding said first and second jaws in said open state during storage or shipment;

a base, said first jaw and said second jaw pivotally connected to said base;

said base having first and second safety hooks and a trip assembly;

said locking mechanism including first and second retaining rods pivotally connected to said base, said first and second retaining rods cooperating with said first and second safety hooks to hold said first and second jaws in said open state; and, said trigger mechanism including a trip assembly and said first and second retaining rods, wherein said first and second retaining rods are releasably connected to said trip assembly.

4. A method for capturing a marine animal, comprising:

providing a sea trap, said sea trap including a first jaw pivotally connected to a cooperating second jaw, said first and second jaws movable between an open animal-receiving state and a closed animal-retaining state, said first and second jaws each carrying an animal-retaining enveloping material, a trigger mechanism for causing said first and second jaws to move from said open state to said closed state, a line connected to said sea trap, and a float;

placing said first and second jaws in said open state and arming said trigger mechanism;

captively placing said float beneath one of said first and second opened jaws;

using said line to lower said sea trap into a body of water having a surface;

the marine animal activating said trigger mechanism thereby causing said jaws to close, capturing the marine animal, and releasing said float; and, observing said float rising to the surface of the body of water.

\* \* \* \* \*